United States Patent
Imamura

[11] Patent Number: 6,126,906
[45] Date of Patent: Oct. 3, 2000

[54] APPARATUS FOR REMOVING HARMFUL COMPONENTS IN A SEMICONDUCTOR EXHAUST GAS

[75] Inventor: Hiroshi Imamura, Suita, Japan

[73] Assignee: Kanken Techno Co., Ltd., Suita, Japan

[21] Appl. No.: 09/174,452

[22] Filed: Oct. 19, 1998

[30] Foreign Application Priority Data

Jun. 18, 1998 [JP] Japan .................................. 10-170899

[51] Int. Cl.[7] .......................... B01D 53/34; B01D 53/68; B01D 53/75

[52] U.S. Cl. .......................... 422/170; 422/171; 422/172; 422/173; 422/182

[58] Field of Search ................................ 422/169–174, 422/181–183; 26/DIG. 9

[56] References Cited

U.S. PATENT DOCUMENTS

| | | | |
|---|---|---|---|
| 3,615,163 | 10/1971 | Brzozowski | 423/240 R |
| 4,125,593 | 11/1978 | Scheifley et al. | 588/213 |
| 4,209,496 | 6/1980 | Carpenter et al. | 423/240 R |
| 4,874,587 | 10/1989 | Galloway | 422/189 |
| 5,649,985 | 7/1997 | Imamura | 55/222 |
| 5,716,428 | 2/1998 | Imamura | 95/225 |
| 5,955,037 | 9/1999 | Holst et al. | 422/171 |

*Primary Examiner*—Marian C. Knode
*Assistant Examiner*—Susan Ohorodnik
*Attorney, Agent, or Firm*—Oblon, Spivak, McClelland, Maier & Neustadt, P.C.

[57] ABSTRACT

An apparatus for removing harmful components in a semiconductor exhaust gas includes: a first water scrubber for washing with water a gas to be processed; a gas decomposer tower disposed downstream of the first water scrubber; a second water scrubber disposed downstream of the gas decomposer tower; and a burner tower disposed downstream of the second water scrubber for burning the processed gas, wherein the gas decomposer tower is capable of thermally decomposing a mixture gas of a saturated or unsaturated hydrocarbon gas and a perfluorocarbon or a perfluoride compound by maintaining the mixture gas at a temperature of 600° C. or more in the absence of separated $O_2$.

6 Claims, 3 Drawing Sheets

APPARATUS FOR REMOVING HARMFUL COMPONENTS IN A SEMICONDUCTOR EXHAUST GAS

BACKGROUND OF THE INVENTION

1. Field of the Invention

The present invention relates to an apparatus for removing harmful components in an exhaust gas derived during manufacturing an electronic circuit element such as a semiconductor device or a liquid crystal device, particularly during a cleaning or etching process. Further, the present invention relates to an apparatus that is applicable to remove harmful components in a gas generated during the process of smelting aluminum.

2. Description of the Prior Art

In a semiconductor manufacturing apparatus such as a CVD apparatus, a gas for deposition (such as $SiH_4$, $Si_2H_6$, $SiH_2Cl_2$, TEOS, $PH_3$, $B_2H_6$, $NH_3$, $N_2O$, or the like) is used in forming various thin films, and a cleaning gas (such as $NF_3$, $SF_6$, $C_2F_6$, $CF_4$, or the like) is usually used for cleaning the inside of the semiconductor manufacturing apparatus after completing the deposition process.

These gases inherently have various dangerous factors such as flammability, explosiveness, corrosiveness, poisonousness, and the like. Therefore, it is required to remove (detoxify) harmful components in these gases using a harm-removing apparatus equipped, for example, with a means for oxidizing and heating the gases before they are released into atmospheric air.

In the semiconductor manufacturing apparatus such as a CVD apparatus, complex decomposition reactions occur in the gases that are being used, so that new decomposition products (such as $F_2$, HF, HCl and SiOx) are generated as a result and these decomposition products are discharged together with the undecomposed deposit gas and the cleaning gas.

Here, one group of gases to be used is what is known as PFC gases. This is an abbreviation for "perfluorocarbon" or "perfluoride compound". Representative examples of PFC are $CF_4$, $CHF_3$, and $C_2F_6$. If the term "compound" is used instead of "carbon", PFC will further include fluorine compounds that do not contain carbon, such as $NF_3$, $SF_6$, and $SF_4$.

The purpose of the present invention is to establish a technique for removal of the former PFC gases, which technique has not yet reached an applicable level for use in a removal device or a removal method. Naturally, however, the technique of the present invention is also applicable for removal of all the PFC gases including the latter PFC gases.

The PFC gases as represented by $CF_4$ and $C_2F_6$ are non-flammable and toxicity of the gases themselves on human beings is unknown. At least, acute and subacute toxicities are not known. However, since the compounds themselves are stable, they remain unchanged and stay for a long period of time if they are released to an ambient atmosphere. It is reported that the life span until consumption in the atmosphere is 50,000 years in the case of $CF_4$, and 10,000 years in the case of $C_2F_6$.

Further, the global warming factor (relative to $CO_2$) is 4,400 in the case of $CF_4$ and 6,200 in the case of $C_2F_6$ (after 20 years have passed), which involves a problem that cannot be left aside in considering the earth environment. Therefore, it is eagerly desired to establish a means for removing the PFC gases as represented by $CF_4$ and $C_2F_6$.

However, the former PFC gases, i.e. the compounds as represented by $CF_4$, $CHF_3$, and $C_2F_6$, have a stable C—F bond (having a bonding energy as large as 120 kcal/mol) and are not easily decomposed, so that it is extremely difficult to remove them by simple thermal oxidation decomposition.

For example, in the case of $C_2F_6$, the decomposition proceeds by a cut in the C—C bond, so that $C_2F_6$ can be removed by limiting the processing flow rate to be less than 250 liters/min at a processing temperature of 1000° C. However, in the case of $CF_4$, it is necessary to cut the C—F bond that has the largest bonding energy, so that a temperature of 1400° C. is required even with the above-mentioned flow rate. In addition, even by the above method, it is difficult to remove more than 80% of the total gas.

Further, if an electric heater is to be used, attainment of a high temperature atmosphere of more than 1400° C. is an upper limit also from the view point of materials for the heater, so that a long-term usage is almost impossible. Moreover, maintaining the temperature of the entire apparatus is also difficult and, in combination with a thermal insulating material, the total volume of the apparatus will be large and it will not be a compact apparatus. What is more important is that the thermal energy cost will be excessively high.

Here, in this field, the following new method has been proposed. International Publication Number WO94/05399 #Method of Decomposing Gaseous Halocarbon# reports that coexistence of $O_2$ makes it possible to decompose and remove, for example, $CF_4$ at a temperature of 600 to 700° C. However, a detailed follow-up experiment of the contents of the publication turned out to be a complete failure in removal under this condition.

Also, an attempt is made to positively introduce $H_2$ gas to pyrolyze PFC. However, it requires a high processing temperature and, besides, it may not be suitable for use from the view point of safety, since the $H_2$ gas is flammable and explosive.

SUMMARY OF THE INVENTION

The present invention is intended to develop a harm-removing apparatus capable of decomposing and removing PFC components at a high removal ratio at a temperature as low as possible (with thermal energy consumed at an amount as small as possible). In other words, the present invention provides an apparatus for removing PFC components at a low temperature, removing the derived fluorine components by separately washing or fixing them, and releasing the other components into the atmospheric air basically as $CO_2$ and $H_2O$. Specifically, a first embodiment of a PFC removing apparatus according to the present invention includes:

(a) a first water scrubber (1) for washing a gas to be processed with water;

(b) a gas decomposer tower (2) disposed downstream of the first water scrubber (1);

(c) a second water scrubber (3) disposed downstream of the gas decomposer tower (2); and (d) a burner tower (4) disposed downstream of the second water scrubber (3) for burning the processed gas, wherein the gas decomposer tower (2) is capable of thermally decomposing a mixture gas of a saturated or unsaturated hydrocarbon gas and PFC (including a perfluorocarbon alone, a perfluoride compound alone, or a mixture thereof) by maintaining the mixture gas at a temperature of 600° C. or more in the absence of separated $O_2$.

Further, as a second embodiment of the invention, the order of disposing (c) and (d) may be reversed, so that a PFC removing apparatus may include:

(c) a burner tower (4) disposed downstream of the gas decomposer tower (2) for burning the processed gas; and (d) a second water scrubber (3) disposed downstream of the burner tower (4).

Also, as a third embodiment of the invention, an adsorber tower (3a) loaded with $CaCO_3$ granules may be disposed instead of the second water scrubber (3). In this case, the adsorber tower (3a) is disposed downstream of the gas decomposer tower (2), and the burner tower (4) is disposed downstream of the adsorber tower (3a).

Major unit operations in the invention are the following three steps.

(a) Thermal decomposition of PFC (b) Exhaustion by washing or removal by fixing of the generated fluorine compounds (c) Removal by burning of other flammable components An important feature of the present invention is the thermal decomposition of PFC of the above step (a) and aims at establishing a technique for processing a gas at a PFC removal ratio of 90% or more in a temperature region (600~1200° C.) considerably lower than the atmosphere temperature required for an ordinary simple thermal decomposition. The PFC removal ratio is calculated as $(A-B) \div A \times 100$, where A and B represent the PFC concentration in the gas introduced into the removing apparatus and the PFC concentration in the released gas, respectively. When the thermal decomposing temperature is at under 600° C. a PFC removal ratio goes down to 20~30%, which is not suitable for use. On the other hand at more than 1200° C., consumption of heat energy needs so much that the heater is impossible to be continuously used for a long period of time. It is like to get a higher thermal decomposing temperature with perfluorocarbon and a lower temperature with perfluoride compound.

The thermal decomposition of PFC that forms an essence of the present invention may employ an electric heater as a heat source or a burner using a liquid fuel such as LPG (Liquefied Petroleum Gas) or LNG (Liquefied Natural Gas) or a gaseous fuel such as $CH_4$, $H_2$, or CO as a heat source. The heat source for heating the gas to be processed is positioned at the gas decomposer tower (2). The electric heater to be used as the heat source may be disposed outside of the gas decomposer tower (2) for heating the gas decomposer (2) from outside or may be disposed inside of the gas decomposer tower (2) for directly heating and decomposing the introduced exhaust gas containing PFC. If the liquid fuel or the gaseous fuel is to be used as the heat source, the gas decomposer tower (2) is heated from outside only.

Into a space within the gas decomposer tower (2), a mixed gas containing PFC as a major component and typically $N_2$ as a carrier gas is introduced, and further a saturated or unsaturated $C_1$–$C_8$ hydrocarbon gas in a gaseous state is simultaneously supplied. In this case, if an $O_2$ gas or an $O_3$ gas is used in combination in the semiconductor manufacturing apparatus, the remaining $O_2$, $O_3$ gas flows as an exhaust gas into the gas decomposer tower (2). However, besides the above remaining $O_2$ or $O_3$ gas, neither an $O_2$, $O_3$ gas nor an external air is intentionally introduced into the gas decomposer tower (2). Therefore, one of the essential conditions in the present invention is that at least the inside of the gas decomposer tower (2) is not an oxidizing atmosphere. This state is hereafter referred to as "absence of separated $O_2$ or $O_3$". In other words, separated $O_2$ or $O_3$ refers to oxygen gas that is not introduced by the reaction in the semiconductor manufacturing apparatus.

Under this condition, PFC is decomposed by appropriately adjusting the PFC concentration in the gas to be processed, the flow rate of the gas to be processed, and the spatial temperature in the gas decomposer tower. In this case, the hydrocarbon introduced as an agent for decomposing PFC is thermally decomposed in a non-oxidizing atmosphere. For example, if propane is used, various decomposition products such as methane, ethane, ethylene, and propylene are generated, and it has been found out that the fluorine components are isolated as $F_2$ or HF due to the interaction between one of the above decomposition products and PFC.

Also, it has been confirmed that the PFC can be almost completely removed even if the temperature of the atmosphere is lower by several hundred degrees than the temperature in processing PFC alone or in an oxidizing atmosphere system.

Without introducing the hydrocarbon agent it is extremely difficult to attain 80% or more of the PFC removal ratio in processing PFC alone or in an oxidizing atmosphere system even if a high temperature region, which is near the upper limit for the material to be used, is employed. This shows that the mechanism of decomposition of the compounds without introducing the hydrocarbon agent is completely different from that of the present invention.

The processed gas discharged from the gas decomposer tower (2) according to the present invention contains $F_2$ or HF gas, a gas generated by decomposition of the hydrocarbon as the decomposing agent, and possibly carbon soot depending on the processing condition.

In the present invention, a fluorine-based exhaust gas and a flammable gas are respectively subjected to harm-removal processes by introducing the two components into separate processing towers in series.

Namely, the former (fluorine-based exhaust gas) is separated and discharged out of the system either by allowing it to be absorbed and dissolved in water by passing it through the second water scrubber (3) or by allowing it to be chemically adsorbed onto a solid adsorbing agent of CaO or $CaCO_3$. The latter (flammable gas) is burnt in the presence of external air and the processed final gas is released into atmospheric air.

These, and other objects and advantages of the present invention will become more evident to those skilled in the art from a consideration of the following detailed description of the preferred embodiment, particularly when read in conjunction with the appended drawings, a brief description of which now follows.

BRIEF DESCRIPTION OF THE DRAWINGS

The above and further objects and features of the invention will more fully be apparent from the following detailed description with accompanying drawings, in which.

DETAILED DESCRIPTION OF THE INVENTION

Hereafter, the present invention will be explained with reference to gas removal used in a cleaning or etching process in manufacturing electronic circuit elements.

However, the present invention is applicable to removal of a gas generated in smelting aluminum.

The PFC removing apparatus of the present invention integrally accommodates, within a cabinet, various devices for performing the three steps of (a) thermal decomposition of PFC, (b) exhaustion by washing or removal by fixing of the generated fluorine compounds, and (c) removal by burning of other flammable components.

Figure 1:
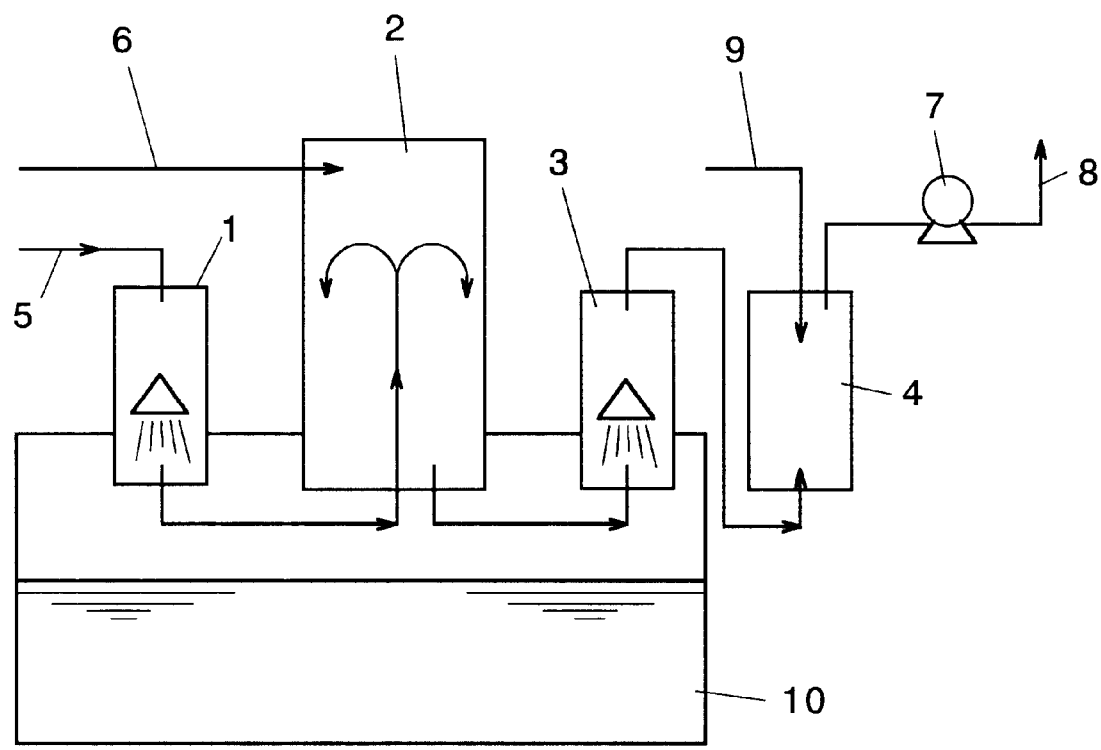
FIG. 1 is a schematic view illustrating a first embodiment of a harm-removing apparatus according to the present invention.

FIG. 1 is a schematic view illustrating a first embodiment of a harm-removing apparatus according to the present invention. Referring to FIG. 1, the reference numeral (1) represents a front water scrubber (first water scrubber) disposed prior to (upstream of) the gas decomposer tower (2). The PFC-containing gas to be processed, which has been sent through the tube (5) for introducing the PFC-containing gas to be processed, is first lead into the front water scrubber (1) to be washed with water.

The gas to be processed, which has been discharged out of the front water scrubber (1) is then sent into the gas decomposer tower (2) through a water tank (10). The heating in the gas decomposer tower (2) may be carried out either by an external heating method or by an internal heating method. In any case, a metal material would be corroded by a corrosive $F_2$ and/or HF gas generated in the gas decomposer tower (2), so that it is recommended to coat the inside of the gas decomposer tower (2) with an alloy having a high Ni content such as an Inconel or with ceramics containing $Al_2O_3$ as a major component. If the electric heater is to be disposed inside the gas decomposer tower (2), the heating element can be inserted in a $Al_2O_3$-based ceramic protection tube for protecting the heater.

The exhaust gas containing PFC such as $CF_4$ and $C_2F_6$ is introduced into the gas decomposer tower (2) using an inert gas, typically $N_2$, as a carrier gas. Here, the residual gas of oxidants, such as $O_2$ and $O_3$, that have been used in the semiconductor manufacturing apparatus employing CVD or the like is introduced as it is into the exhaust-gas harm-removing apparatus of the present invention. However, additional oxidant such as $O_2$ or external air is not introduced into the exhaust-gas harm-removing apparatus of the present invention. Accordingly, separated $O_2$ does not exist in the gas decomposer tower (2).

Then, any of saturated or unsaturated $C_1$-$C_8$ hydrocarbons or a mixture gas thereof is positively introduced into the gas decomposer tower (2) through a hydrocarbon gas introduction tube (6). Specific examples of the hydrocarbon to be used in the present invention include methane, ethane, propane, n- or iso-(the same applies to the subsequent hydrocarbons) butane, pentane, hexane, heptane, octane, ethylene, propylene, butylene, budadiene, and further aromatic hydrocarbons such as benzene, toluene, and xylene. A city gas may be used as well.

The concentration of PFC that can be removed according to the present invention extends in a wide range. For example, if the concentration of PFC is within a range of 100 ppm to 5%, at least 90% of the PFC can be removed. Although the removal of PFC is possible for a PFC concentration in a range of less than 100 ppm or more than 5%, it may not be possible to attain more than 90% of the harm-removing ratio.

The flow rate of the gas to be processed according to the present invention is preferably within a range of 5 to 700 liters/min. Although the removal process can be carried out for a flow rate of less than 5 liters/min, the energy efficiency of the apparatus would be poor, giving rise to useless operations. If the flow rate is more than 700 liters/min, transmission of energy to the gas to be processed would be insufficient, whereby the removal ratio is likely to decrease.

The amount of hydrocarbon gas to be present in decomposing PFC is preferably 0.1 to 3 mol with respect to 1 mol of the PFC. If the amount is less than 0.1 mol, the effect of decreasing the decomposition temperature and increasing the removal ratio, which is the purpose of the present invention, is unsatisfactory. On the other hand, if the amount is more than 3 mol, thermally decomposed products such as soot are generated in a large amount in the processed exhaust gas, leading to useless consumption of hydrocarbons and complication of the steps for post-processing the exhaust gas after decomposition, although the PFC removal ratio of more than 90% may be attained; hence it is not preferable.

Whether the heating source is located outside or inside of the gas decomposer tower, the temperature within the tower can be in a low temperature zone of several hundred degrees centigrade as compared with a simple thermal decomposition (including oxidation decomposition) which is not the method of the present invention.

By a conventional simple thermal decomposition, the removal ratio might be no greater than 80 to 85% at a temperature zone of, for example, 1100 to 1200° C. for decomposing $C_2F_6$, for example. Moreover, a byproduct $CF_4$ would appear in the processed gas.

In the case of decomposing $CF_4$, in a conventional system the removal ratio is at most about 70% even at a temperature zone of 1400° C., which ratio is far from the ratio of 90% intended by the present invention. Furthermore, if the electric heater is to be used as a heat source, it is technically difficult to use the heater at a temperature around 1400° C. for a long period of time, so that preferably the heater should be used at a temperature below 1100° C.

According to the present invention, PFC can be removed at a temperature lower than in decomposing PFC alone or in the presence of $O_2$. A temperature of 850° C. would be sufficient for decomposing $C_2F_6$; and $CF_4$ can be removed at a temperature of 1000 to 1200° C. at a removal ratio of more than 90%.

According to the present invention, the hydrocarbons introduced into the gas decomposer tower (2) react with any residue of $O_2$ or $O_3$ that may have been used for oxidizing PFC during the cleaning process in the semiconductor manufacturing apparatus, thus allowing the residue to disappear, and further the hydrocarbons are thermally decomposed into various components at a given temperature.

For example, propane is decomposed at a temperature of 780° C. to be converted into such substance as methane, ethane, ethylene, propylene, hydrogen, and carbon. During the process, PFC such as $C_2F_6$ and $CF_4$ will be involved in the decomposition, whereby the fluorine components are separated in the form of $F_2$ or HF.

The fluorine components of PFC processed in the gas decomposer tower are discharged in the form of $F_2$ and/or HF. This processed gas is passed through the rear water scrubber (second water scrubber) (3) to dissolve the fluorine components in water or is introduced into the adsorber tower (3a) loaded with a solid filler of CaO, $CaCO_3$, or a mixture thereof to allow the fluorine components to be adsorbed and removed in the form of $CaF_2$.

Figure 2:
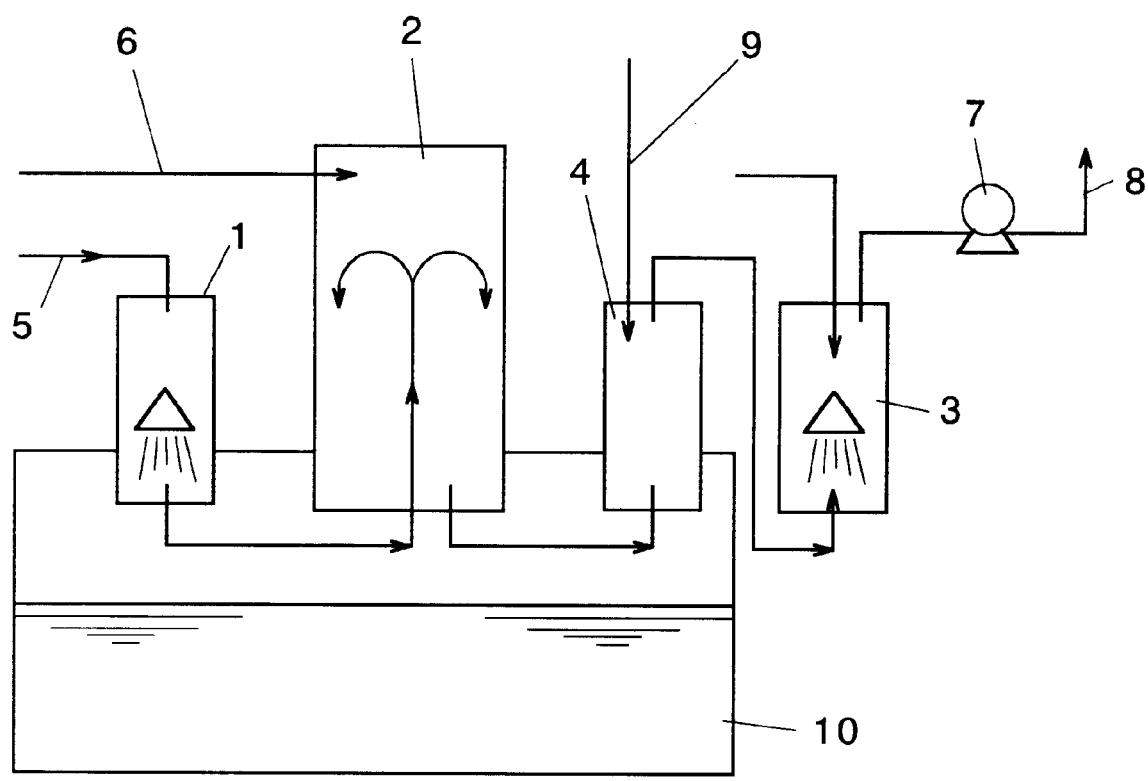
FIG. 2 is a schematic view illustrating a second embodiment of the harm-removing apparatus according to the present invention.
Figure 3:
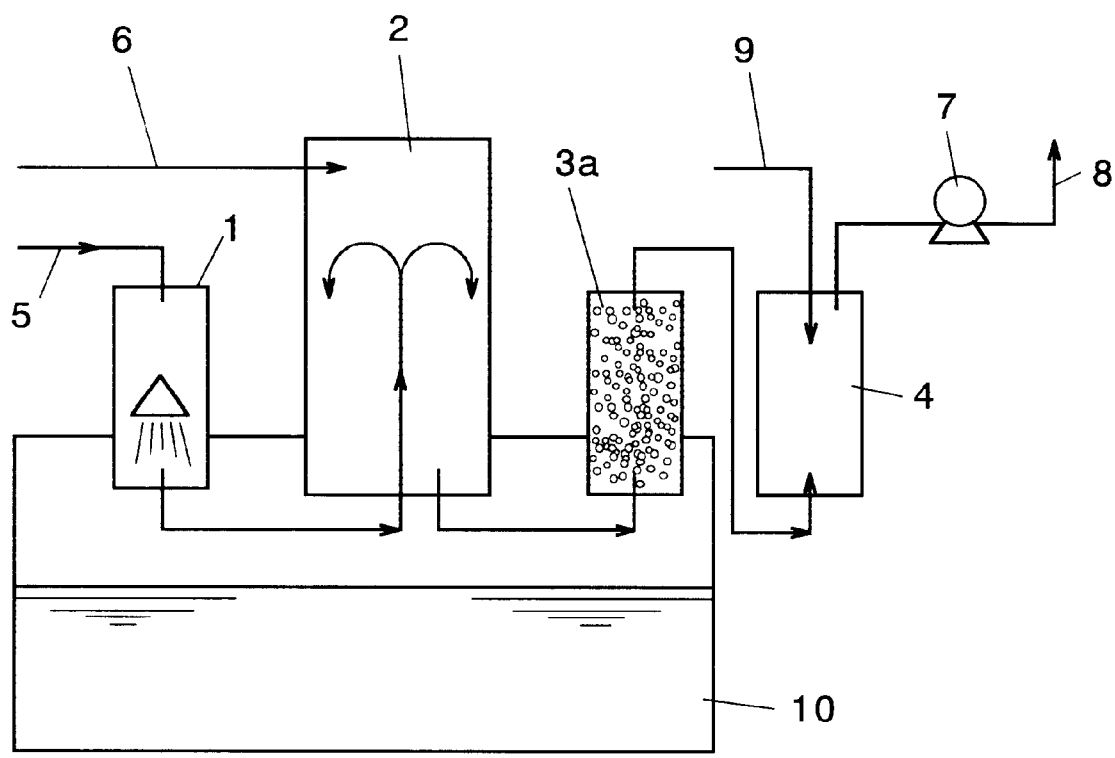
FIG. 3 is a schematic view illustrating a third embodiment of the harm-removing apparatus according to the present invention.

The gas body thus deprived of the fluorine components by any of the above-mentioned methods is sent to the processed-gas burner tower (4), where the gas body is mixed with external air sent from the air introduction tube (9) to burn the flammable components, which are finally converted back into $CO_2$ and $H_2O$ and discharged into atmospheric air through the gas discharging tube (8). In FIGS. 1 to 3, the reference numeral (7) represents a suction fan.

Here, the positions of the processed-gas burner tower (4) and the rear water scrubber (3) may be reversed, whereby the gas processed in the gas decomposer tower may be burnt in the processed-gas burner tower (4) and then passed through the rear water scrubber (3) to be cooled and discharged into the atmospheric air. In other words, the order of arranging the processed-gas burner tower (4) and the rear water scrubber (3) is arbitrary as long as they are disposed in series.

EXAMPLE 1

A mixed gas containing $CF_4$ at 1% and $N_2$ at 99% was passed at a flow rate of 30 liters/min through a front water scrubber (first water scrubber) into a gas decomposer tower. The gas decomposer tower has an inner wall coated with an alumina-based castable fire-resistant material and incorporates 15 rod-like electric heaters (enclosed in an alumina-based protection tube) dangling therein.

A mixture gas containing propane at 90% and n-butane at 10% was supplied at a flow rate of 0.3 litre/min into the gas decomposer tower. The heater surface temperature was maintained at 1100° C. The processed gas was sucked by a fan disposed outside of the cabinet and, while maintaining the system in a negative pressure state, it was passed through a rear water scrubber (second water scrubber) to allow the generated byproducts of $F_2$ and HF to be absorbed and dissolved in water. The flow rate of water to be used was 10 liters/min.

Then, the washed gas was introduced into a burner tower whose inside was maintained at a temperature of 500° C., whereby the processed flammable gas was burnt and oxidized in the presence of air introduced from outside. Measurement showed that the $CF_4$ concentration in the processed gas was 50 ppm, giving a $CF_4$ removal ratio of 99.5%.

Comparative Example 1

A gas having the same $CF_4$ composition as in Example 1 was supplied at a flow rate of 30 liters/min into the same removal apparatus as in Example 1. The gas was processed by maintaining the heater surface temperature at 1100° C. without supplying any hydrocarbons. Measurement showed that the $CF_4$ concentration in the processed gas was 9100 ppm, giving a removal ratio of only 9%.

Further, under the above condition, the heater surface temperature was raised to 1450° C. for an instant to process the gas. Measurement showed that the $CF_4$ concentration in the processed gas was 3200 ppm, giving a removal ratio of 68%.

Under this temperature condition, air was additionally supplied from outside at a flow rate of 5 liters/min to process the gas. Measurement showed that the $CF_4$ concentration in the processed gas was 3000 ppm, giving a removal ratio of 70%.

From the above results, it will be understood that the present invention enables almost complete removal of PFC even at a temperature lower by 350° C. than that of the Comparison Example. Thus, since the purpose of the present invention can be achieved at a temperature lower by 300 to 400° C., the selection range of the material to be used would be widened in terms of the heat resistance of the apparatus.

EXAMPLE 2

A mixed gas containing $C_2F_6$ at 2%, $N_2$ at 97.9%, and oxygen at 0.1% was passed through a front water scrubber and supplied into a gas decomposer tower at a flow rate of 100 liters/min. The gas decomposer tower is made of SUS316L with its inside being coated with an alumina-based castable fire-resistant material. An electric heater wire is wound around the outside of the tower to heat the gas from the outside.

Into the gas decomposer tower was supplied a city gas (13A) containing methane at 88%, ethane at 6%, propane at 4%, and butane at 2% at a flow rate of 4 liters/min. The spatial temperature inside the gas decomposer tower was maintained at 850° C. The processed gas was washed in a rear water scrubber (with water supplied at a flow rate of 15 liters/min), passed through a burner tower maintained at 600° C. and having air supplied from outside, and discharged to outside.

Under this condition, fine particle carbon (soot) floated in water in the rear water scrubber, and the mist-like soot was transferred to the burner tower to be removed.

Measurement showed that the $C_2F_6$ concentration in the gas released into atmospheric air was 400 ppm, giving a removal ratio of 98%. No presence of $CF_4$ was observed in the processed gas.

EXAMPLE 3

Under the same condition as in Example 2, an apparatus equipped with an adsorber tower loaded with soybean-size granular CaO was employed instead of using the rear water scrubber, and the gas processed in the gas decomposer tower was passed through the adsorber tower. Under a suction condition using an external fan, no acidic component was observed in the discharged gas.

Comparative Example 2

The exhaust gas containing PFC was processed under the same condition as in Example 2 except that the city gas was not supplied. Measurement showed that the $C_2F_6$ concentration in the gas discharged into the atmospheric air was 1.76%, giving a removal ratio of 12%. Also, $CF_4$ appeared newly as a byproduct in the processed gas. Therefore, the PFC removal ratio is even worse than 12%.

Under the above condition, removal of $C_2F_6$ was carried out under the same condition except that the spatial temperature in the tower was maintained at 1150° C. Measurement showed that the $C_2F_6$ concentration in the discharged gas was 4000 ppm, giving a removal ratio of 80%. Also, presence of $CF_4$ component as a byproduct was confirmed.

As mentioned above, the present invention can provide a harm-removing apparatus capable of decomposing and removing PFC components at a high removal ratio at a low temperature (with less consumption of heat energy). Accordingly, the PFC gas, whose removal is difficult, can be removed at a low energy cost.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An apparatus for removing harmful components out of an exhaust gas, comprising:

a first water scrubber configured to wash said exhaust gas with water;

a gas decomposer tower disposed downstream of the first water scrubber and configured to decompose the washed exhaust gas;

a hydrocarbon gas introduction mechanism configured to introduce a hydrocarbon gas into said gas decomposer tower;

a second water scrubber disposed downstream of the gas decomposer tower; and a burner tower disposed downstream of the second water scrubber configured to burn a gas from said second water scrubber, wherein the gas decomposer tower is configured to maintain a mixture gas of said hydrocarbon gas and the washed exhaust gas at a temperature of 600~1200° C. in the absence of separated $O_2$.

2. An apparatus for removing harmful components out of an exhaust gas, comprising:

a first water scrubber configured to wash with water said exhaust gas;

a gas decomposer tower disposed downstream of the first water scrubber and configured to decompose the washed exhaust gas;

a hydrocarbon gas introduction mechanism configured to introduce a hydrocarbon gas into said gas decomposer tower;

a burner tower disposed downstream of the gas decomposer tower configured to burn a gas from said decomposer tower; and a second water scrubber disposed downstream of the burner tower;

wherein the gas decomposer tower is configured to maintain a mixture gas of said hydrocarbon gas and the washed exhaust gas at a temperature of 600~1200° C. in the absence of separated $O_2$.

3. An apparatus for removing harmful components out of an exhaust gas, comprising:

a first water scrubber configured to wash with water said exhaust gas;

a gas decomposer tower disposed downstream of the first water scrubber and configured to decompose the washed exhaust gas;

a hydrocarbon gas introduction mechanism configured to introduce a hydrocarbon gas into said gas decomposer tower;

an adsorber tower disposed downstream of the gas decomposer tower and loaded with at least one of CaO and $CaCO_3$ granules, and a burner tower disposed downstream of the adsorber tower configured to burn a gas from said adsorber tower, wherein the gas decomposer tower is configured to maintain a mixture gas of said hydrocarbon gas and the washed exhaust gas at a temperature of 600~1200° C. in the absence of separated $O_2$.

4. An apparatus according to any one of claims 1 to 3, wherein the decomposer tower comprises a heater; and an inside surface of the gas decomposer tower and an outer surface of said heater are coated with an anticorrosive material.

5. An apparatus according to claim 4, wherein the anticorrosive material coating the inside surface of the gas decomposer tower is an Inconel.

6. An apparatus according to claim 4, further comprising an anticorrosive protection tube coated with an anticorrosive material and configured to protect the heater;

wherein the anticorrosive materials coating the inside surface of the gas decomposer tower and said anticorrosive tube are composed of ceramics comprising $Al_2O_3$.

* * * * *